June 20, 1944.  A. N. BLUM  2,351,737

SAW

Filed May 9, 1940  2 Sheets-Sheet 1

Inventor:-
Arthur N. Blum
by his Attorneys
Howson & Howson

June 20, 1944.  A. N. BLUM  2,351,737
SAW
Filed May 9, 1940  2 Sheets-Sheet 2

Inventor:-
Arthur N. Blum
by his Attorneys
Howson & Howson

Patented June 20, 1944

2,351,737

UNITED STATES PATENT OFFICE 2,351,737

SAW

Arthur N. Blum, Philadelphia, Pa.

Application May 9, 1940, Serial No. 334,242

10 Claims. (Cl. 143—133)

This invention relates to improvements in saws of the type wherein the teeth are all cutting teeth and adapted to cut in both directions of blade movement, as for example in certain so-called "pulpwood" saws, and a principal object of the invention is to provide a saw of this type which will combine to a more pronounced degree than heretofore has been found possible the essential functional characteristics of rapidity and accuracy of cut, and easy cutting without chatter.

Another object of the invention is to provide an improved saw blade of the stated class, which by reason of the form and arrangement of teeth may be readily sharpened and maintained in condition for maximum operating efficiency.

A further object is to provide a blade which will retain its operating efficiency under normal conditions for a longer period of working time than do the prior blades of the same type.

The invention resides in the novel form, relative arrangement, and set of the teeth of the blade hereinafter specifically described and illustrated in the attached drawings, in which.

Figure 1:
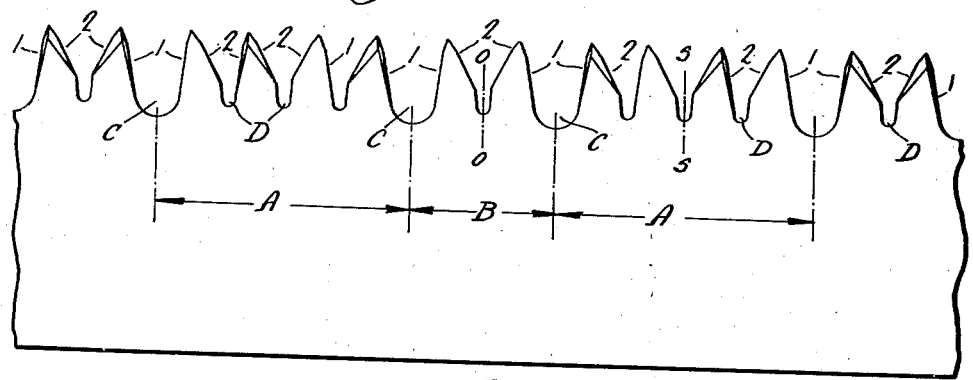
Figure 1 is a side view of a section of a saw blade made in accordince with and constituting a preferred embodiment of my invention.

In the preferred embodiment of my invention illustrated in Figs. 1 to 6, inclusive, the blade comprises two systems of groups of teeth, the individual groups of each system being similar in the respects hereinafter noted, but differing from the individual groups of the other system. The said systems are so related that throughout the blade the groups of one of said systems alternate with the groups of the other of said systems, so that in effect the blade is made to comprise a plurality of distinct cutting areas each of which differs from the cutting areas immediately adjoining.

In the drawings, the individual groups of teeth constituting one of said systems are designated by the reference character A; and B designates the individual groups of the other system. Each of the groups A comprises four teeth; each of the groups B two teeth. Each proximate pair of the groups A is separated by one of the lesser groups B; and each adjoining pair of groups, irrespective of the systems to which they may belong, is separated by a wide major gullet C, the function of which is to clean the kerf cut by the teeth of the accumulated chips and sawdust. These major gullets define the limits of the aforesaid cutting areas, which areas correspond to the groups A and B.

Figure 2:
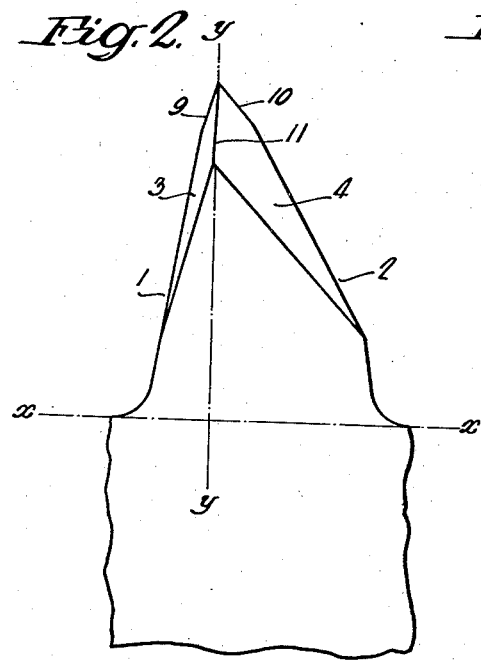
Fig. 2 is an enlarged side view of one of the individual teeth of the blade.

As shown in the drawings, all of the teeth of the blade above their common root line are of the same size and shape. Within the respective groups, the teeth are evenly spaced, and the spacing is the same in both of the groups A and B. The bases of teeth are separated and spaced from each other in the present instance by sharpening gullets D, which are relatively narrower than the major gullets C and have rounded bottoms and are of sufficient width to afford ample clearance at the bases of the teeth for correct sharpening. Preferably, and as best shown in Fig. 2, both edges of the individual tooth are inclined to the longitudinal axis of the blade and preferably, also, converge from opposite sides of a line which intersects the apex of the tooth and which is normal to the said longitudinal axis or to the common root line of the teeth, but the inclinations of the edges differ. The broken line $x$—$x$, which parallels the longitudinal axis of the blade, may be considered the common root line of the teeth, and $y$—$y$ the said normal line which intersects the apex of the tooth. It will be noted that the edge I of the tooh forms with the line $x$—$x$ a relatively steep angle as compared with the angle formed by the opposite working edge. In effect, the root portion of the tooth is multilateral, and this form of root is preferred, although the root may be formed with straight or curved edges without departure from the invention.

In each of the groups A and B the teeth are so relatively arranged that each of the cleaning gullets C is flanked by two of the relatively steep edges I. Thus the teeth of the individual two-tooth groups B are arranged relatively so that the edges 2 of lesser inclination are made to face toward the center of the group and the opposite edges I, are on the exterior of the group. Similarly the teeth of the individual groups A are arranged relatively so that the edge 2 of lesser inclination in each of the teeth faces toward the center of the group. Each of the groups A and B, therefore, is symmetrical with respect to a line bisecting the group, and each group A virtually consists of a two-tooth group augmented by two flanking teeth. The cutting edges of these flanking teeth face in the same direction of blade movement as the corresponding edges of the respective immediately adjoining teeth of the associated two-tooth group. Thus, the normal projections upon the median plane of the saw body of the cutting edges of the flanking teeth will parallel the similar projections of the corresponding edges of the respective adjoining teeth of the same group.

Referring to Fig. 1, it will be noted that the two teeth which constitute the terminal pair at one end of each of the augmented groups A are, in effect, made to face in the opposite direction from the two teeth at the other end of the group so that the group is symmetrical with respect to a line s—s. In the individual groups B, the two teeth face in opposite directions so that each of these groups also is in the same sense symmetrical with respect to a median line o—o. As previously set forth, all of the teeth above their root line are identical as to form and size, and irrespective of grouping, the corresponding edges of the correspondingly placed and set teeth will be parallel to each other. Irrespective of set, the normal projections upon the median plane of the blade of the corresponding cutting edges of all the teeth, which edges face in the same direction of blade motion, are parallel. While in each of the individual cutting areas the arrangement of the teeth is symmetrical as set forth above, it is to be noted that the cutting areas or groups are asymmetrically arranged with respect to the major gullets C.

All teeth are set above their common root line so as to avoid deformation of the blade body proper. Such deformation or crimping of the blade body reduces the effectiveness of the saw by increasing friction in the kerf and requiring more force to pull the saw in cutting.

Figure 6:
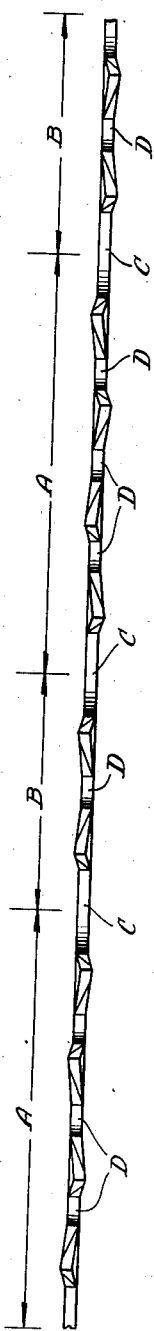
Fig. 6 is an enlarged top edge view of a section of the blade shown in Fig. 1, and Figs. 7, 8 and 9 are views similar to Fig. 6 illustrating modifications within the scope of the invention.
Figure 7:

Referring to Fig. 6, it will be noted that whereas in the respective major groups A the teeth are set alternately to opposite sides of the blade, the two teeth of each of the minor groups B are set to the same side. Also the proximate terminal teeth of each proximate pair of groups A are set to the same side of the blade, and the teeth of the interposed group B are set to the opposite side. Thus the leading tooth of any individual group of teeth, irrespective of the direction of movement of the blade, will enter the kerf on the opposite side of the blade from the leading teeth of the proximate corresponding groups. The same result may be obtained by setting the teeth in the manner illustrated in Fig. 7, wherein the two teeth or terminal pair of teeth at one end of each of the groups A are set to the same side of the blade and the remaining two teeth to the opposite side. By setting the teeth in pairs in this manner added resistance to loss of set is obtained, in that the set of each tooth is immediately reinforced by the set of a companion tooth.

In conventional blades having teeth grouped in cutting areas of equal width and of an equal number of teeth, evenly or substantially evenly spaced, there is a tendency for the blade to chatter. The blade is highly tensioned in the frame, and when a tooth strikes an obstruction, it starts a train of vibrations which are synchronously intensified by the subsequent teeth if they are grouped in areas of equal length and substantially evenly spaced. In a blade made in accordance with my invention where the cutting areas are of uneven lengths, one of which is short and contains only two teeth, such intensification of the vibrations of the blade is dampened out, substantially reducing or eliminating the chatter. It has been proposed to accomplish similar results by uneven spacing of the teeth alone in blades with conventional cutting areas having equal number of teeth, but to be effective, the difference in spacing of the latter would have to be very pronounced and of an order entailing a decided variability of the tooth pitch, which is not desirable for practical reasons.

The setting of the teeth described above, which provides that the leading tooth in each group in both directions of blade movement will enter the kerf at the opposite side of the blade from either of the leading teeth of the proximate like groups, effects a substantial balance in the operation of the blade which insures a proper tracking of the blade in the intended plane of cut, and largely precludes the tendency exhibited by other forms of blade of this general type to cut inaccurately or off the normal plane. Also as previously set forth, the setting of two adjoining teeth to the same side of the blade materially increases the resistance of the teeth to loss of set, so that the blade will maintain its operating efficiency for longer periods of time than where the teeth are set in the normal manner alternately to opposite sides of the blade. This setting of two teeth together not only has the favorable effect noted above upon the two teeth immediately involved, but also helps to maintain the set of the other teeth of the blade. As indicated above, the fact that the teeth are uniform as to size and shape and are uniformly and adequately spaced materially simplifies the sharpening and resharpening operations and maintenance of the blade in its original state of high functional efficiency.

When the teeth of a blade constituted as described above are efficiently sharpened, for example in the manner now to be described, the blade will exhibit in pronounced degree the combined characteristics of easy cutting without chatter and rapidity and accuracy of cut. As previously stated, both edges of the individual tooth constitute active cutting edges. Both of the edges 1 and 2 are beveled at the same side of the tooth, the beveled surface being indicated by the reference numerals 3 and 4 respectively. These surfaces are inclined to the lines 5 and 6 which represent, respectively, the corners of the inclined edges 1 and 2 at the unbeveled side of the tooth, and as a result, a portion of each of the edge surfaces 1 and 2 is left unaffected. These unaffected areas, which occupy planes substantially normal to the plane sides of the blade, are designated by the reference numerals 7 and 8. The bevels 3 and 4 are formed so as to intersect the plane of the opposite side of the tooth, only within a limited area immediately adjoining the tip, so that at the tip the tooth is slightly truncated. This is clearly shown in Fig. 2. The effect is to form at each side of the tip a clearly defined sharp cutting edge, 9 and 10 respectively, of substantial length, which produce a slicing drawing cut in both directions of blade movement, these edges constituting the lines of intersection of the bevels 3 and 4 with the plane of the unbeveled side of the tooth, and the convergence of these lines or cutting edges forms the apex of the tooth. In general, the actual lengths of the cutting edges 9 and 10 should not very materially exceed the actual thickness of the unsharpened blade at the breast, i. e., the thickness of the tooth at the tip prior to sharpening. More specifically, it is preferable that the said cutting edges do not exceed in length approximately 150% of the said unsharpened breast thickness.

Figure 5:
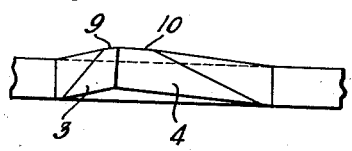
Fig. 5 is a top edge view of the tooth shown in Fig. 2.
Figure 3:
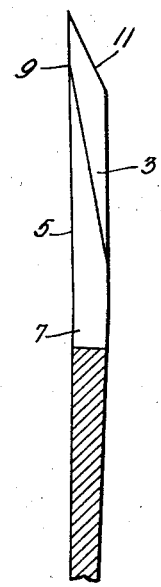
Figs. 3 and 4 are, respectively, opposite edge views of the tooth shown in Fig. 2.
Figure 4:
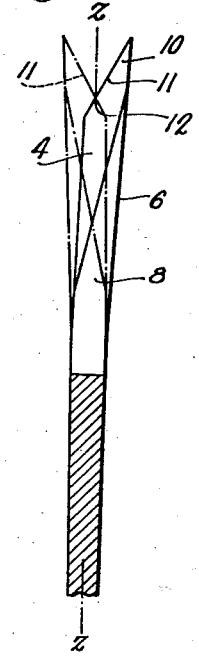

The manner in which the tooth is set is illustrated in Figs. 3, 4 and 5. As therein shown, the set is away from the bevel face of the tooth, so that the sharp cutting edges 9 and 10 are moved outwardly from the plane of the particular side of the blade in which they would normally lie. Furthermore, the set is of a character to retain the tooth or the offset portion thereof substantially in a normal flat plane, as shown in Figs. 3 and 4. The set of the tooth is effected by bending the latter on a line extending approximately through the centers of the arcs at the bottoms of the spacing gullets D, which, as shown in Fig. 2, is above the common root line x—x and leaves the blade proper unaffected by the bending of the teeth the offset portions of the teeth retaining their flat form, as previously set forth. This flat or straight set increases the effectiveness of the cutting edges 9 and 10 and operates to limit the extent to which the tip of the tooth digs into the work. The kerf produced by a saw having this character of tooth and set is relatively smooth and uniform.

In conjunction with the shape of the cutting edges above described, the straight set and its amount have an effect upon the cutting action of the blade and the ease with which it is performed. I have found that for best results, the total set of the blade, equalling the sum of the sets of two teeth set to the right and left respectively, should be less than 200% of the thickness of the unsharpened blade at its breast. This amount of set must be maintained for continuous best performance of the saw, which is difficult, in case of the so-called pulpwood saws, made of thin steel, because the side pressure in the kerf while cutting has a tendency to bend the teeth back into the plane of the blade and in time to reduce the initial set. As previously described, this tendency may be counteracted by setting two teeth in succession to one side of the blade so that the set of one tooth reinforces the set of the subsequent one, and this also, by maintaining the width of the kerf, relieves the pressure on others of the teeth. By limiting the total set of the blade as described above, the bevel edges 11 (see Fig. 4), of two succeeding teeth set to opposite sides of the blade (which edges 11 define the conjunction of the bevel faces 3 and 4), will, in projection, intersect within their respective lengths. In this manner, the work will be scored and cut by the cutting edges 9 and 10 on both sides of the kerf, and the slug thus prepared will be removed by the raking action of the portions of the teeth adjoining the said cutting edges, the kerf being swept by the in-projection-overlapping faces of the teeth near the tip. In other words, the said edge 11 of each of the teeth of the blade will be intersected by a median plane, indicated in Fig. 4 by the broken line z—z, bisecting the thickness of the blade. It will be understood, of course, that the inclination of the edges 11 to the plane of the tooth, which inclination is determined by the angle of the faces 3 and 4 to the same plane, should be such as to afford the beveled tip of the tooth an adequate major thickness and strength, and when this is observed, the said median plane will intersect the edges 11 relatively close to the apices of the teeth and within the area of the cutting edges 9 and 10, as indicated at 12 in Fig. 4. From the foregoing discussion, it will be seen how the three variables, namely, the grouping of the teeth in unequal cutting areas, their setting and their sharpening, are tied together functionally to produce the highly advantageous results claimed for my invention.

Figure 8:
Figure 9:
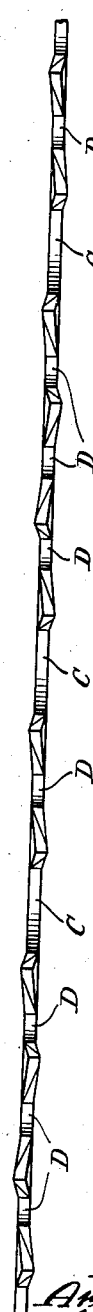

The various structural features described above contribute jointly to the production of a blade which exhibits extraordinarily easy cutting without chatter, and extreme rapidity and accuracy of cut, and one which not only maintains these characteristics for relatively long periods of use but which may be readily resharpened and maintained in its original high operating efficiency. It is to be noted, however, that while the various structural features will augment each other to an extent affording exceptionally good results in combination, certain of these features individually are capable of effecting a material improvement in the functional characteristics of any saw in which they may be incorporated. It is apparent, therefore, that there may be a substantial modification of the blades herein specifically described. Two such modifications are illustrated in Figs. 8 and 9 of the drawings. In each of these modifications, the form and group arrangement of the teeth are the same as previously described, but the two teeth in each of the groups B are set respectively to opposite faces of the blade. It will be apparent that certain of the benefits of the invention as defined in the appended claims will accure to these modifications.

I claim:

1. A saw blade having exclusively cutting teeth of substantially uniform height and size each set to one or other side of the blade, said teeth being separated by gullets including large cleaning gullets and smaller sharpening gullets, said sharpening gullets having their bottoms aligned on a common root line and said cleaning gullets having their respective bottoms also aligned on a line parallel to said root line, each of said teeth having oppositely beveled and sharpened knife-like cutting edges converging and terminating in a scalene cutting point adapted to slice in both directions with a drawing cut, said cutting edges being inclined to said root line but at different angles other than 90° and the normal projections upon the median plane of the blade body of the corresponding cutting edges of all the teeth, which edges face in the same direction of blade movement, being parallel, said teeth being arranged in symmetrical two-tooth groups having their beveled and sharpened cutting edges of steeper inclinations situated on the exterior of said two-tooth groups, each alternate two-tooth group being augmented by flanking teeth having their cutting edges facing in the same direction of blade movement as the corresponding edges of the respective immediately adjoining teeth of the associated two-tooth group, the augmented groups being separated from the intervening unaugmented two-tooth groups by said large cleaning gullets, and the two teeth flanking each of the large gullets being set respectively and entirely above their respective roots to the opposite sides of the blade, the set of each side of the blade not exceeding in amount the unsharpened breast thickness of the blade.

2. A saw blade having exclusively cutting teeth of substantially uniform height and size, each set to one or other side of the blade, said teeth being separated by gullets including large cleaning gullets and smaller sharpening gullets, said sharpening gullets having their bottoms aligned on a common root line and said cleaning gullets having their respective bottoms also aligned on a parallel to said root line, each of said teeth having oppositely beveled and sharpened knife-like cutting edges converging and terminating in a scalene cutting point adapted to slice in both directions with a drawing cut, said cutting edges being inclined to said root line but at different angles other than 90°, and the normal projections upon the median plane of the blade body of the corresponding cutting edges of all the teeth, which edges face in the same direction of blade movement, being parallel, said teeth being arranged in symmetrical two-tooth groups with each alternate group augmented by two additional teeth one at each end of the group, the teeth of the two-tooth groups having their beveled and sharpened cutting edges of steeper inclination situated on the exterior of said two-tooth groups and each of said augmenting teeth having its cutting edges facing in the same direction of blade movement as the corresponding edges of the adjoining teeth of the augmented two-tooth group, and the augmented groups being separated from the intervening unaugmented two-tooth groups by said large cleaning gullets, the two individual teeth of the two-tooth groups being set entirely above their respective roots to one and the same side of the blade with the said groups alternating to the opposite sides of the blade.

3. A saw blade having exclusively cutting teeth of substantially uniform height and size, each set to one or other side of the blade, said teeth being separated by gullets including large cleaning gullets and smaller sharpening gullets, said sharpening gullets having their bottoms aligned on a common root line and said cleaning gullets having their respective bottoms also aligned on a parallel to said root line, each of said teeth having oppositely beveled and sharpened knife-like cutting edges converging and terminating in a scalene cutting point adapted to slice in both directions with a drawing cut, said cutting edges being inclined to said root line but at different angles other than 90°, and the normal projections upon the median plane of the blade body of the corresponding cutting edges of all the teeth, which edges face in the same direction of blade movement, being parallel, said teeth being arranged in symmetrical two-tooth groups with each alternate group augmented by two additional teeth one at each end of the group, the teeth of the two-tooth groups having their beveled and sharpened cutting edges of steeper inclination situated on the exterior of said two-tooth groups and each of said augmenting teeth having its cutting edges facing in the same direction of blade movement as the corresponding edges of the adjoining teeth of the augmented two-tooth group, and the augmented groups being separated from the intervening unaugmented two-tooth groups by said large cleaning gullets, the teeth of each terminal pair in the augmented groups being set together to one side of the blade with the said pairs in any one group set to opposite sides, and the teeth of each of the two-tooth groups being similarly set together to one side of the blade and to the opposite side from the proximate terminal pairs of teeth in the immediately adjoining augmented groups.

4. A saw blade having exclusively cutting teeth of substantially uniform height and size, each set to one or other side of the blade, said teeth being separated by gullets including large cleaning gullets and smaller sharpening gullets, said sharpening gullets having their bottoms aligned on a common root line and said cleaning gullets having their respective bottoms also aligned on a parallel to said root line, each of said teeth having oppositely beveled and sharpened knife-like cutting edges converging and terminating in a scalene cutting point adapted to slice in both directions with a drawing cut, said cutting edges being inclined to said root line but at different angles other than 90°, and the normal projections upon the median plane of the blade body of the corresponding cutting edges of all the teeth, which edges face in the same direction of blade movement, being parallel, said teeth being arranged in symmetrical two-tooth groups with each alternate group augmented by two additional teeth one at each end of the group, the teeth of the two-tooth groups having their beveled and sharpened cutting edges of steeper inclination situated on the exterior of said two-tooth groups and each of said augmenting teeth having its cutting edges facing in the same direction of blade movement as the corresponding edges of the adjoining teeth of the augmented two-tooth group, and the augmented groups being separated from the intervening unaugmented two-tooth groups by said large cleaning gullets, the two teeth of the two-tooth groups being set together to one side of the blade, and the teeth in each of the augmented groups being set alternately to the opposite sides of the blade.

5. A saw blade having exclusively cutting teeth of substantially uniform height and size, each set to one or other side of the blade, said teeth being separated by gullets including large cleaning gullets and smaller sharpening gullets, said sharpening gullets having their bottoms aligned on a common root line and said cleaning gullets having their respective bottoms also aligned on a parallel to said root line, each of said teeth having oppositely beveled and sharpened knife-like cutting edges converging and terminating in a scalene cutting point adapted to slice in both directions with a drawing cut, said cutting edges being inclined to said root line but at different angles other than 90°, and the normal projections upon the median plane of the blade body of the corresponding cutting edges of all the teeth, which edges face in the same direction of blade movement, being parallel, said teeth being arranged in symmetrical two-tooth groups with each alternate group augmented by two additional teeth one at each end of the group, the teeth of the two-tooth groups having their beveled and sharpened cutting edges of steeper inclination situated on the exterior of said two-tooth groups and each of said augmenting teeth having its cutting edges facing in the same direction of blade movement as the corresponding edges of the adjoining teeth of the augmented two-tooth group, and the augmented groups being separated from the intervening unaugmented two-tooth groups by said large cleaning gullets, the teeth being set so that for both directions of blade movement the leading teeth of any one of the groups containing the larger number of teeth is set to the opposite side of the blade from the leading tooth of the next following group containing the larger number of teeth, and to the same side of the blade as the leading tooth of the intervening two-tooth group.

6. A saw blade having exclusively cutting teeth of substantially uniform height and size each set to one or other side of the blade, said teeth being separated by gullets including large cleaning gullets and smaller sharpening gullets, said sharpening gullets having their bottoms aligned on a common root line and said cleaning gullets having their respective bottoms also aligned on a line parallel to said root line, each of said teeth having oppositely beveled and sharpened knifelike cutting edges converging and terminating in a scalene cutting point adapted to slice in both directions with a drawing cut, said cutting edges being inclined to said root line but at different angles other than 90°, and the normal projections upon the median plane of the blade body of the corresponding cutting edges of all the teeth, which edges face in the same direction of blade movement, being parallel, said teeth being arranged in symmetrical two-tooth groups having their beveled and sharpened cutting edges of steeper inclinations situated on the exterior of said two-tooth groups, each alternate two-tooth group being augmented by flanking teeth having their cutting edges facing in the same direction of blade movement as the corresponding edges of the respective immediately adjoining teeth of the associated two-tooth group, the augmented groups being separated from the intervening unaugmented two-tooth groups by said large cleaning gullets, the teeth being set so that for both directions of blade movement the leading tooth of any group is set to the same side as the leading tooth of the next following group having the same number of teeth.

7. A saw blade having teeth of substantially the same size and shape, each sharpened and set so as to cut in both directions of blade movement, the cutting edge of the blade consisting of alternately arranged groups of two and four teeth respectively and intervening chip removing gullets, the bases of the teeth of each group being separate and spaced apart, one edge of each tooth being relatively steep as compared with the other edge with respect to the longitudinal axis of the blade and the teeth being arranged in the respective groups so that the edges of lesser steepness face toward the centers of the groups, the individual teeth having both edges beveled at the same side of the tooth with each of the bevels intersecting the other side of the tooth only within a limited area immediately adjoining the tip and forming at said intersection a sharp cutting edge terminating in the apex of the tooth, and each said individual tooth being set to the side of the blade away from the bevel face of the tooth and to an extent such that the total set of the blade shall be not more than approximately 200% of the thickness of the unsharpened blade at the breast.

8. A saw blade having teeth of substantially the same size and shape each sharpened and set so as to cut in both directions of blade movement, the cutting edge of the blade consisting of alternately arranged groups of two and four teeth respectively and intervening chip-removing gullets, the bases of the teeth of each group being separate and spaced apart, one edge of each tooth being relatively steep as compared with the other edge with respect to a longitudinal axis of the blade and the teeth being arranged in the respective groups so that the edges of lesser steepness face toward the centers of the groups, the individual teeth having both edges beveled at the same side of the tooth with each of the bevels intersecting the other side of the tooth only within a limited area immediately adjoining the tip and forming at said intersection a sharp cutting edge terminating in the apex of the tooth and not exceeding in length approximately 150% of the thickness of the unsharpened blade at the breast, each said individual tooth being set to the side of the blade away from the bevel faces of the tooth and to an extent such that the total set of the blade shall be not more than approximately 200% of the said unsharpened breast thickness of the blade.

9. A saw blade having teeth of substantially the same size and shape, each sharpened and set so as to cut in both directions of blade movement, the cutting edge of the blade consisting of alternately arranged groups of two and four teeth respectively and intervening chip removing gullets, the bases of the teeth of each group being separate and spaced apart, one edge of each tooth being relatively steep as compared with the other edge with respect to the longitudinal axis of the blade and the teeth being arranged in the respective groups so that the edges of lesser steepness face toward the centers of the groups, the individual teeth having both edges beveled at the same side of the tooth with each of the bevels intersecting the other side of the tooth only within a limited area immediately adjoining the tip and forming at said intersection a sharp cutting edge terminating in the apex of the tooth, each said individual tooth being set to the side of the blade away from the bevel face of the tooth and to an extent such that the total set of the blade shall be not more than approximately 200% of the thickness of the unsharpened blade at the breast, and the common line of intersection of said bevel faces in each said individual tooth being intersected by a median plane bisecting the thickness of the blade.

10. A saw blade having teeth of substantially the same size and shape each sharpened and set so as to cut in both directions of blade movement, the cutting edge of the blade consisting of alternately arranged groups of two and four teeth respectively and intervening chip-removing gullets, the bases of the teeth of each group being separate and spaced apart, one edge of each tooth being relatively steep as compared with the other edge with respect to a longitudinal axis of the blade and the teeth being arranged in the respective groups so that the edges of lesser steepness face toward the centers of the groups, the individual teeth having both edges beveled at the same side of the tooth with each of the bevels intersecting the other side of the tooth only within a limited area immediately adjoining the tip and forming at said intersection a sharp cutting edge terminating in the apex of the tooth and not exceeding in length approximately 150% of the thickness of the unsharpened blade at the breast, each said individual tooth being set to the side of the blade away from the bevel faces of the tooth and to an extent such that the total set of the blade shall be not more than approximately 200% of the said unsharpened breast thickness of the blade, and the common line of intersection of said bevel faces in each said individual tooth being intersected by a median plane bisecting the thickness of the blade and at a point within the area of said cutting edges.

ARTHUR N. BLUM.